Nov. 24, 1942.    R. S. YOUNG    2,303,188
TOOL POST
Filed Dec. 2, 1940
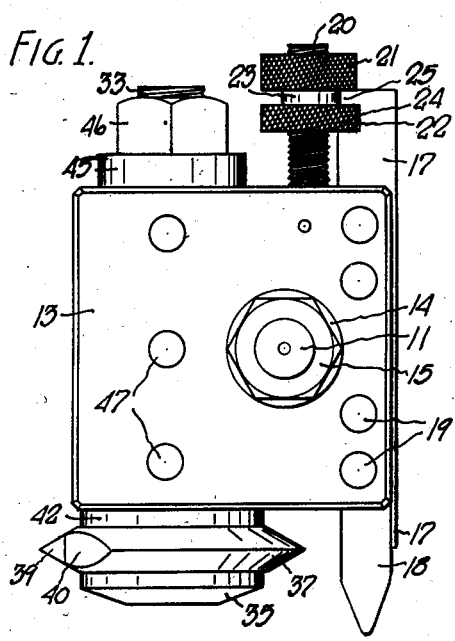
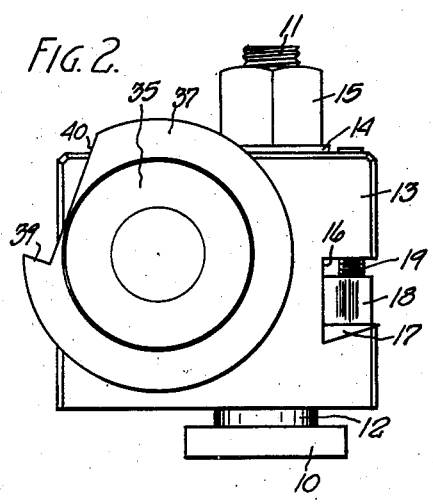
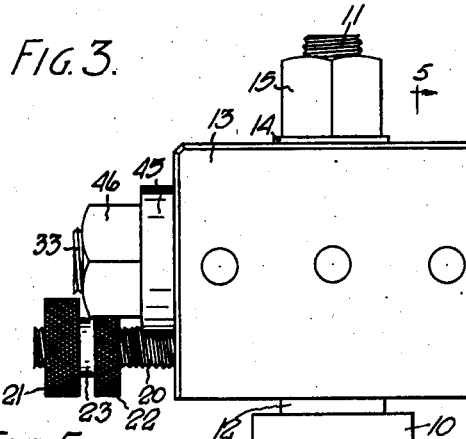
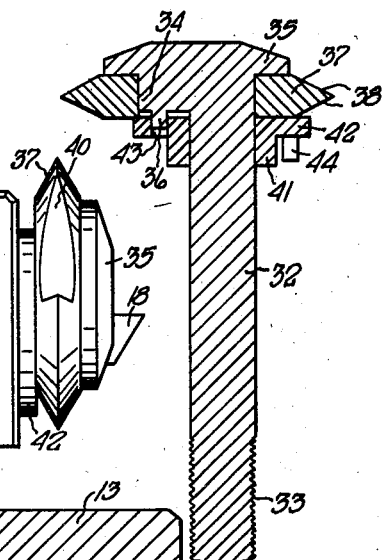
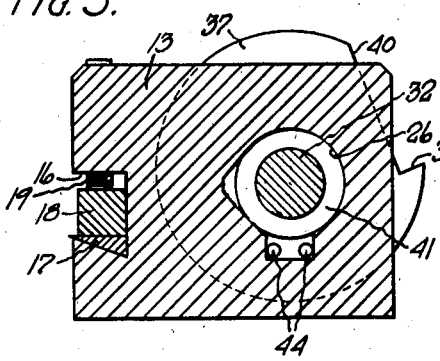
INVENTOR.
ROY S. YOUNG.
BY Oltsch & Knoblock
Attorneys Patented Nov. 24, 1942

2,303,188

UNITED STATES PATENT OFFICE 2,303,188

TOOL POST

Roy S. Young, South Bend, Ind., assignor to South Bend Lathe Works, South Bend, Ind., a corporation of Indiana Application December 2, 1940, Serial No. 368,162

10 Claims. (Cl. 29—48)

This invention relates to tool posts, and more particularly to a tool post for use on lathes or like machines and adapted to receive and mount a tool relative to the machine and to the work on the machine.

The primary object of the invention is to provide a tool post which is substantially universally applicable for receiving and mounting tools for boring, turning, or threading work upon a machine.

A further object is to provide a tool post embodying a novel construction and arrangement of parts for mounting any selected one of a group of tools of different types in a lathe or other machine in proper and accurate relation to the work carried by the lathe or machine.

A further object is to provide a tool post having novel thread cutting means.

A further object is to provide a novel combination of tool post and circular thread cutting means having a cutter which may be ground progressively through the major portion of its circumference to afford long effective life for the cutter.

A further object is to provide novel means for adjusting and positioning a circular thread cutter adapted to be progressively ground, in accurate relation to the work to be cut at all stages of the life of the cutter.

A further object is to provide a tool post with a tool receiving passage of substantially heart-shaped cross section, said passage being interrupted by a longitudinal communicating groove, wherein the V-shaped portion of the passage is centered by a longitudinal plane which intersects the center plane of the other groove coincident with the axis of the circular portion of said passage.

A further object is to provide a device of this character wherein an annular cutter is rotatably mounted on a carrier unit adapted to be supported by a tool post with which it interengages and by which it is clamped to fixedly position said cutter in operative relation thereto.

A further object is to provide a tool post with a passage therethrough including a circular portion interrupted by a groove, said circular portion being adapted to receive a cylindrical tool portion having a projection seating in said groove for accurately and non-rotatably positioning the carrier relative to the tool post.

A further object is to provide a novel combination of tool post and thread cutting means wherein said means is adjustable relative to said post for cutting either right or left-hand threads.

A further object is to provide a novel, simple and effective thread cutter having a circular cutting element and means for frictionally clamping said element in operative position relative to a support.

Other objects will be apparent from the description and appended claims.

In the drawing:

Fig. 1 is a top plan view of the tool post illustrating the manner in which a cutter bit and a thread cutter are mounted thereon.

Fig. 2 is a side elevation of the tool post viewed from the end of the thread cutter.

Fig. 3 is a side view of the tool post illustrating the thread cutter in side elevation.

Fig. 4 is a longitudinal transverse sectional view of the thread cutting tool per se.

Fig. 5 is a vertical transverse sectional view of the tool block taken on line 5—5 of Fig. 3 and illustrating the manner in which the thread cutting tool is mounted in the tool block.

Fig. 6 is a fragmentary transverse sectional view similar to Fig. 5 and illustrating the manner in which a boring tool or the like is mounted in the tool post.

Referring to the drawing, which illustrates the preferred embodiment of the invention, the numeral 10 designates a base plate mounting a vertical shaft 11. Shaft 11 has a collar 12 mounted thereon and bearing against the upper face of base plate 10. A metal block 13 is provided with a suitable vertical bore (not shown), preferably slightly off center, through which the shaft 11 projects. Tool block 13 bears upon the collar 12. A washer 14 encircles shaft 11 and engages the upper face of block 13. The upper end of shaft 11 is threaded, and a suitable nut 15 is threaded on shaft 11 to bear upon the washer 14. It will be understood that the base plate 10 is of a construction adapted to be keyed in a suitable groove of a compound rest base of a lathe, and that the block 13 is angularly adjustable relative to the base plate 10 and may be locked in any desired adjustment by means of the nut 15.

At one side thereof, the block 13 is provided with a groove 16 whose upper face preferably extends horizontally, whose inner face preferably extends vertically, and whose lower face is inclined longitudinally and also downwardly and inwardly. A taper gib 17 rests upon the lower face of the groove 16 and supports a horizontal cutter bit 18. A plurality of vertical screws 19 are threaded into the block and adapted to bear upon the upper face of the cutter bit 18. A threaded shaft 20 is fixedly secured to the tool block 13 to project from the end thereof adjacent the large dimension end of the groove 16. Shaft 20 extends parallel to the upper and inner faces of groove 16 and mounts thereon a nut having an outer knurled portion 21, an inner knurled portion 22, and a reduced dimension cylindrical portion 23 intermediate said knurled portions. Taper bar 17 is preferably notched at 24 to fit around the inner knurled portion 22 and has a lip 25 fitting between the knurled portions 21—22. It will be observed that this construction permits the accurate mounting of cutter bit 18 relative to the work mounted upon the lathe or like machine by accommodating micrometrical adjustment of the cutter bit in a vertical direction upon adjustment of the taper gib 17 within groove 16 by means of the adjusting nut 21—23. When the proper vertical adjustment of the cutter bit has been made, the set screws 19 may be tightened to lock the cutter bit in the adjusted position.

The tool block 13 is also provided with a horizontal passage therethrough parallel to the upper and inner faces of the groove 16 and adjacent the side of the block opposite groove 16. This passage is best illustrated in Figs. 5 and 6 and has a cross sectional shape or configuration defined in part by a substantially semi-cylindrical wall 26 with which merges one of a pair of converging angularly disposed flat faces 27 which are equi-angularly related to a horizontal plane common to the axis of the cylindrical portion 26 of the bore. Faces 27 serve to define a V-shaped groove projecting inwardly and horizontally of the block from the cylindrical bore portion. A substantially rectangular groove also interrupts the cylindrical bore at the lower side thereof, said groove being defined by a pair of vertical parallel faces 28 equi-spaced from a vertical plane intersecting the center plane of the V-groove at the axis of the cylindrical bore. A horizontal face 29 extends between the lower ends of the vertical faces 28 and is spaced from the axis of the cylindrical bore, a distance substantially greater than the radius of said cylindrical bore.

The configured bore above described is adapted to receive and mount a boring tool or any other suitable tool having a cylindrical stem in the well-known and conventional manner best illustrated in Fig. 6. The shank 30 of such a tool is seated against the faces 27 defining the V-shaped portion of the bore, and is clamped in this position by set screws 31 extending horizontally through the outer portion of the block with their axes intersecting the axis of the cylindrical portion 26 of the bore.

One of the principal advantages of this tool block is in the fact that the aforesaid horizontal bore may also serve to mount a thread cutting unit. The thread cutting unit is best illustrated in Fig. 4 and comprises a shaft 32 threaded at one end portion 33. Integral with the shaft 33 is formed a cylindrical enlargement 34, eccentric of the shaft 32, and an enlarged head 35 concentric with cylindrical enlargement 24. Enlargement 34 is of a radius at least equal to the radius of shaft 32 plus the spacing of the axes of shaft 32 and said enlargement 34. A pin 36 projects from the inner face of portion 34 in spaced relation from and parallel to the shaft 32. A cutter ring 37 having bevelled peripheral faces 38, defining a sharp V-shaped cutting edge in cross section, is journaled upon the cylindrical enlargement 34. Ring 37 is preferably wider than enlargement 34. The peripheral edge of cutter ring 37 is notched to provide a face 39 in a plane parallel to and spaced from the axis of the ring, and by a face 40 substantially at right angles to the face 39. The face 39 is formed in acute angled relation to a tangent of the cutter edge taken at the point at which the face 39 intersects said edge. A collar 41 fits slidably and snugly upon the shaft 32 and its inner portion is of a diameter to fit snugly around the shaft 32 and its inner portion is of a diameter to fit snugly within the cylindrical portion 26 of the bore of the tool block 13. An enlarged integral concentric flange 42 projects at the outer end of the collar 41. Flange 42 is provided with a transverse bore 43 of a size and location to snugly receive the pin 36 projecting from head portion 34 of shaft 32. The flange 42 also carries a pair of inwardly projecting spaced parallel pins 44 which are adapted to seat in opposite corners of the rectangular groove defined by faces 28 and 29.

It will be observed that when the cutter ring 37 is mounted upon the enlarged portion 34 of the shaft 32 and its inner face is engaged by the flange 42 of the collar 41 with pin 36 seating in passage 43, the parts are properly positioned for insertion within the bore of the tool block. The parts are so related that when the shaft 32 is inserted into the bore, the collar 41 will fit snugly within the cylindrical portion 26 of the bore and the pins 44 will seat in the opposite lower corners of the groove defined by walls 28 and 29. Hence, the shaft 32 is held against rotation, and the eccentric cutter carrying portion 34 thereof is accurately positioned with respect to the tool block. The length of the shaft 32 is sufficient for the major portion of the threaded end 33 to project from the end of the block 13 opposite the cutter head. A positioning washer 45 encircles the projecting end of shaft 32 to bear against the face of the block 13. Washer 45 is preferably provided with a reduced dimension portion (not shown) complementary to the collar 41 which seats within the cylindrical portion 26 of the bore and cooperates with the collar portion 41 to hold the shaft 32 in true axial alignment with the bore 26. Nut 46 is threaded upon the shaft 32 to secure the same to block 13 and to positively clamp the cutter ring 37 between the head 35 and the collar flange 42, whereby said ring will be held against rotation.

One of the important features of the invention is that the eccentric mounting of the cutter ring with respect to the shaft 32 and the bore 26 of the block 13 accommodates and makes possible the mounting of the thread cutter in the same bore which accommodates a boring tool. In this connection, it is necessary, when cutting threads, that the cutting edge be exactly on center with respect to the work. In the instant device, this is accomplished by properly positioning the cutting edge formed by the periphery of the ring and the face 39. When so positioned, as best illustrated in Fig. 2, the face 39 is disposed at an angle to the plane between the axes of the cutter and the work to accommodate the chips formed by the cutter. In using a boring tool, the condition which pertains is that the cutting edge must be centered relative to the work, while the shaft or shank of the tool must be positioned off center in order to afford clearance for the chips or strips formed incident to the boring operation. Hence, it is possible, by the use of this construction, to use the same bore for selectively mounting a thread cutter or a boring tool.

Another important advantage of the instant construction lies in the fact that the cutter ring 37 may be ground as required for the full extent of its circumference between the points at which the faces 39 and 40 initially intersect the peripheral edge. As best seen in Fig. 2, this comprises more than ¾ of the peripheral extent of the cutter. Hence, the cutter ring 37 will have a long life, and the full extent of its cutting edge may be progressively used by successive sharpening operations. In this connection, note that the rotative adjustment of the cutter ring relative to the enlargement 34 of shaft 32 for the purpose of accommodating each successive grinding operation does not change the effective angle at which the cutting point faces the work. This result is achieved by virtue of the fact that the ring 37 rotates upon eccentric enlargement 34 while the position of said eccentric enlargement is maintained constant by reason of the interlocked engagement between pin 36 and bore 45 and between pins 34 and the bore of the tool block.

Another advantage of this construction is the fact that the bore of the block may also be used to mount tools or tool holders having elongated stems of rectangular cross section. Specifically, the stem of such a tool may be situated in the rectangular groove portion 28—29 of the bore and held to place by set screws 47 positioned vertically in the upper part of the block with their axes coinciding with the vertical center plane of said rectangular groove 28—29, whereby said set screws may bear against the upper face of the rectangular stem when the same is seated in said groove 28—29.

I claim:

1. In combination, a mounting element having a passage therethrough, said passage being of generally cylindrical cross sectional shape interrupted by a longitudinal groove, an elongated tool carrier having an eccentric cylindrical portion and an enlarged head, an annular cutting tool encircling said cylindrical portion, a collar encircling said carrier and fitting snugly in said bore, means for locking said collar and carrier against relative rotation, a projection on said collar seating in said groove to hold said collar against rotation in said mounting element, and means for securing said carrier to said mounting element, said last-named means serving to fixedly clamp said cutting tool between said head and collar.

2. The combination defined in claim 1, and means cooperating with said collar for positioning said carrier parallel to the axis of said passage.

3. In combination, an elongated carrier having an enlarged head and a cylindrical portion adjoining said head, a collar encircling said carrier, said collar having a portion of larger diameter than said cylindrical portion, means for locking said collar and carrier against relative rotation, a cutter ring rotatably mounted on said cylindrical portion, a mounting having a bore receiving portions of said carrier and collar, means for securing said carrier to said mounting and urging said head and collar toward each other to fixedly clamp said cutter ring therebetween, and means for locking said collar against rotation relative to said mounting.

4. In combination, an elongated carrier including a stem, an enlarged head and a cylindrical portion adjoining said head, a cutter ring journaled on said cylindrical portion, said ring being wider than said cylindrical portion, a mounting having a bore loosely receiving said stem, a collar on said stem, a portion on said collar engaging said cutter, and another portion fitting snugly in said bore, and means for securing said carrier on said mounting with said cutter clamped between said collar and head.

5. The combination defined in claim 4, wherein said cylindrical portion and head are concentric with each other and eccentric of said carrier stem.

6. In combination, a tool post including a block having a bore therethrough, said bore being of cylindrical cross section interrupted by a longitudinal groove extending outwardly from said cylindrical portion, a shaft threaded at one end and having a journal and enlarged head at its opposite end, a cutter ring rotatably mounted on said journal, said shaft extending through said bore, securing means threaded on said shaft and bearing against said block to draw said shaft and head in non-rotating clamping engagement with said cutter ring, and means carried by said shaft and including a portion seating in said groove and locked against rotation relative to said shaft.

7. The combination defined in claim 6, wherein said journal is eccentric of said shaft and of a radius at least equal to the sum of radius of said shaft plus the spacing of the axes of said shaft and journal.

8. The combination defined in claim 6, wherein said last-named means is interlocked with said journal.

9. The combination with a tool post including a block having a cylindrical bore therethrough interrupted by a recess at least at one end thereof, of a shaft longer than said block fitting freely in said passage, said shaft being threaded at one end and having an enlarged journal and a head larger than said journal at its opposite end, a locking element projecting from the inner end of said journal, a collar snugly encircling said shaft and fitting snugly in said bore, said collar having an enlarged outer end portion recessed to receive said locking element, a cutter ring rotatable on said journal, a locking projection on said collar seating in said block recess, and a nut on the threaded end of said shaft, said cutter ring being fixedly clamped between said head and collar.

10. In combination, a tool block having a bore therethrough, an elongated carrier having an eccentric end portion terminating in an enlarged head, said bore being larger than said carrier, a cutter ring journaled on said eccentric carrier portion, a positioning collar encircling said carrier, said collar having a portion fitting snugly in said bore and having an enlarged end flange bearing against said cutter, and means securing said carrier to said block.

ROY S. YOUNG.